US011124400B2

(12) United States Patent
Christian et al.

(10) Patent No.: US 11,124,400 B2
(45) Date of Patent: Sep. 21, 2021

(54) PERSONAL WATERCRAFT LIFT AND TRANSPORTING CART

(71) Applicants: Brad Christian, San Clemente, CA (US); Jeremy Kegher, Foothill Ranch, CA (US)

(72) Inventors: Brad Christian, San Clemente, CA (US); Jeremy Kegher, Foothill Ranch, CA (US)

(*) Notice: Subject to any disclaimer, the term of this patent is extended or adjusted under 35 U.S.C. 154(b) by 0 days.

(21) Appl. No.: 15/530,907

(22) Filed: Mar. 21, 2017

(65) Prior Publication Data

US 2018/0273363 A1   Sep. 27, 2018

(51) Int. Cl.
| | | |
|---|---|---|
| *B66F 7/22* | (2006.01) | |
| *B62B 3/02* | (2006.01) | |
| *B60S 13/00* | (2006.01) | |
| *B60S 5/00* | (2006.01) | |
| *B66F 7/28* | (2006.01) | |

(52) U.S. Cl.
CPC .............. *B66F 7/22* (2013.01); *B60S 13/00* (2013.01); *B60S 5/00* (2013.01); *B62B 3/02* (2013.01); *B62B 2202/403* (2013.01); *B66F 7/28* (2013.01)

(58) Field of Classification Search
CPC . B60S 5/00; B60S 13/00; B65G 67/32; B65G 67/42; B66F 7/22
USPC .......................... 414/419–421, 668, 678, 778
See application file for complete search history.

(56) References Cited

U.S. PATENT DOCUMENTS

| | | | | | |
|---|---|---|---|---|---|
| 2,584,240 | A | * | 2/1952 | Stewart | B66F 9/12 414/530 |
| 3,294,266 | A | * | 12/1966 | Snow | B65F 1/12 248/133 |
| 3,750,810 | A | * | 8/1973 | Stanfill | B60P 1/16 248/139 |
| 3,857,248 | A | * | 12/1974 | Rutter | B63C 3/06 414/678 |
| 3,863,890 | A | * | 2/1975 | Ruffing | B66F 7/0625 254/10 C |
| 3,978,999 | A | * | 9/1976 | Ryder | B65G 65/23 414/404 |
| 4,527,944 | A | * | 7/1985 | Qually | A61G 5/104 414/678 |
| 4,686,925 | A | * | 8/1987 | Stuck | B63C 5/02 114/224 |
| 4,828,222 | A | * | 5/1989 | Rossato | B66F 7/0691 254/124 |

(Continued)

*Primary Examiner* — James Keenan
(74) *Attorney, Agent, or Firm* — Gordon E. Gray, III; Gray Law Firm

(57) ABSTRACT

The present invention is a personal watercraft lift and transporting cart. In particular, the present invention is directed to a lift that can lift and rotate a personal watercraft ("PWC") so that repairs can be conducted more ergonomically. The lift preferably has two lifting arms attached to upright frame members. In turn, the upright frame members extend vertically from a mounting base. The lift also preferably has two actuators pivotally attached to the lifting arms at one end and attached to the mounting base at the other end. When the actuators extend, the lifting arms lift and rotate. The transporting cart preferably has a cart chassis, a hull bunk and two receivers, where the first and second receiver are spaced to allow insertion of the first and second lifting arms so that the cart can be lifted and rotated by the lift with PWC mounted on the cart.

2 Claims, 19 Drawing Sheets

(56) References Cited

U.S. PATENT DOCUMENTS

| | | | | | |
|---|---|---|---|---|---|
| 5,044,863 | A | * | 9/1991 | LaBass | B65F 3/04 |
| | | | | | 414/408 |
| 5,090,842 | A | * | 2/1992 | Montgomery | B63C 3/06 |
| | | | | | 114/44 |
| 5,320,475 | A | * | 6/1994 | Pinder | B62B 1/08 |
| | | | | | 414/343 |
| 5,328,161 | A | * | 7/1994 | Stuck | B23K 37/0426 |
| | | | | | 269/17 |
| 5,478,191 | A | * | 12/1995 | Rober | B25H 1/0007 |
| | | | | | 212/180 |
| 5,562,401 | A | * | 10/1996 | Drew | B65H 1/00 |
| | | | | | 211/170 |
| 5,564,683 | A | * | 10/1996 | Stuck | B25B 11/00 |
| | | | | | 269/131 |
| 5,810,548 | A | * | 9/1998 | Stenudd | A61G 7/08 |
| | | | | | 212/255 |
| 5,829,948 | A | * | 11/1998 | Becklund | B66F 7/0625 |
| | | | | | 414/607 |
| 8,388,265 | B2 | * | 3/2013 | Basta | B63C 3/06 |
| | | | | | 405/3 |
| 2005/0002767 | A1 | * | 1/2005 | Oosterhouse | B60P 3/1033 |
| | | | | | 414/498 |
| 2005/0212191 | A1 | * | 9/2005 | McKelvie | B60S 13/00 |
| | | | | | 269/17 |

\* cited by examiner

Fig : 3
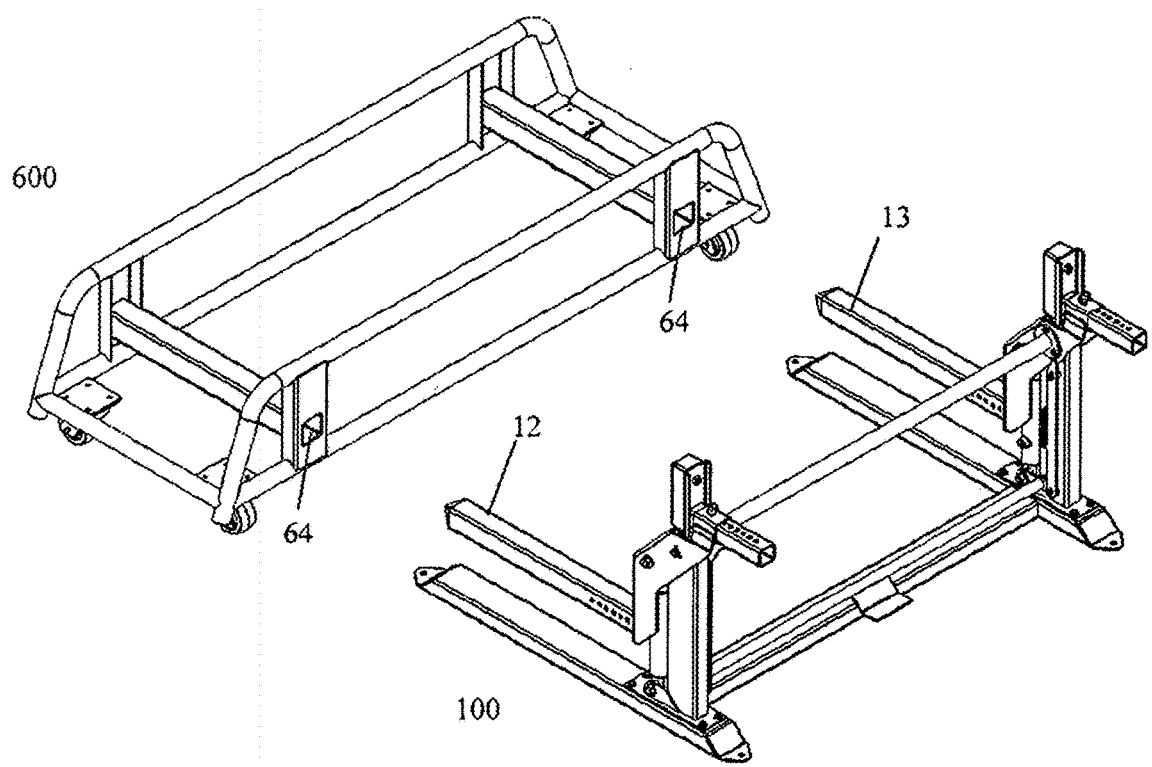

Fig: 4
600
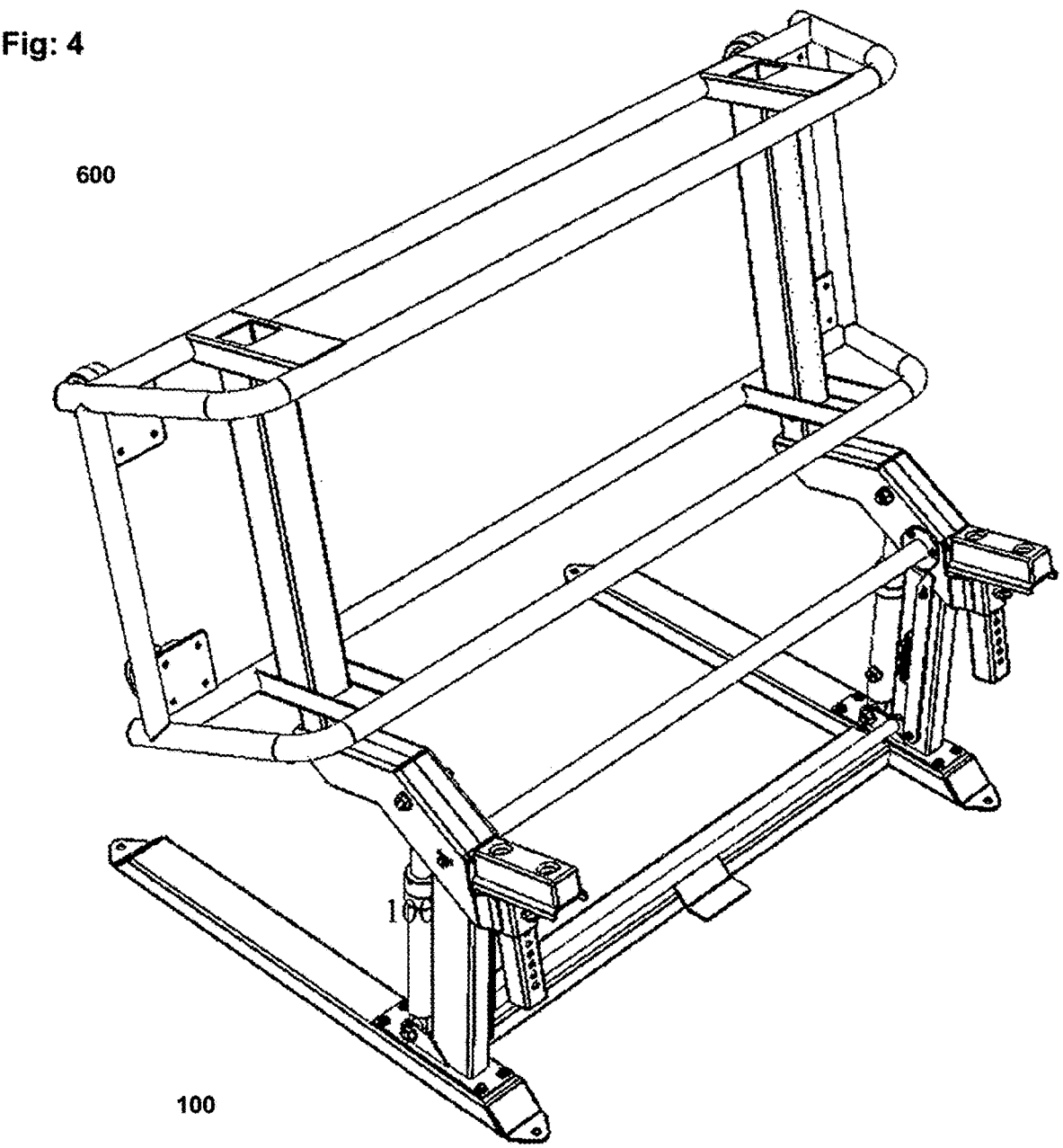
100

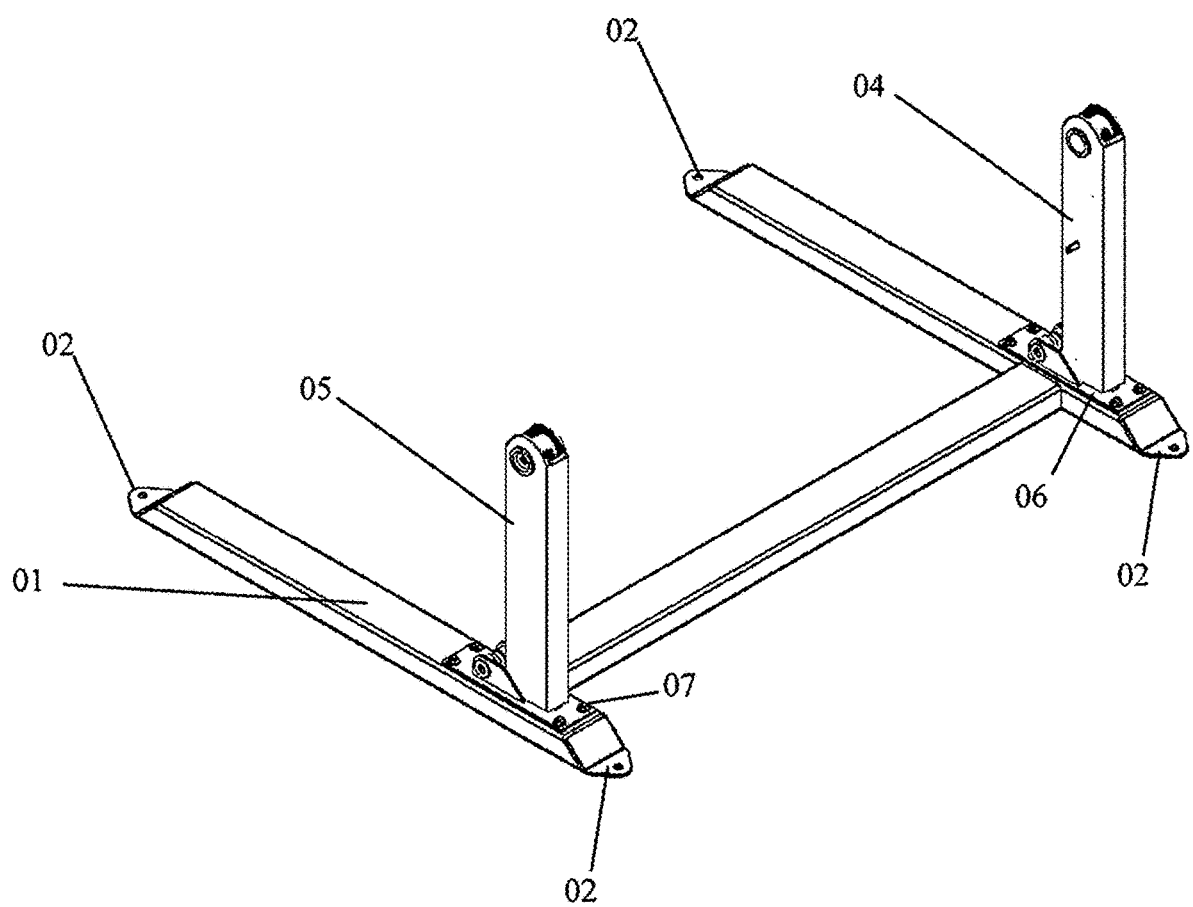
Fig: 5

Fig : 7
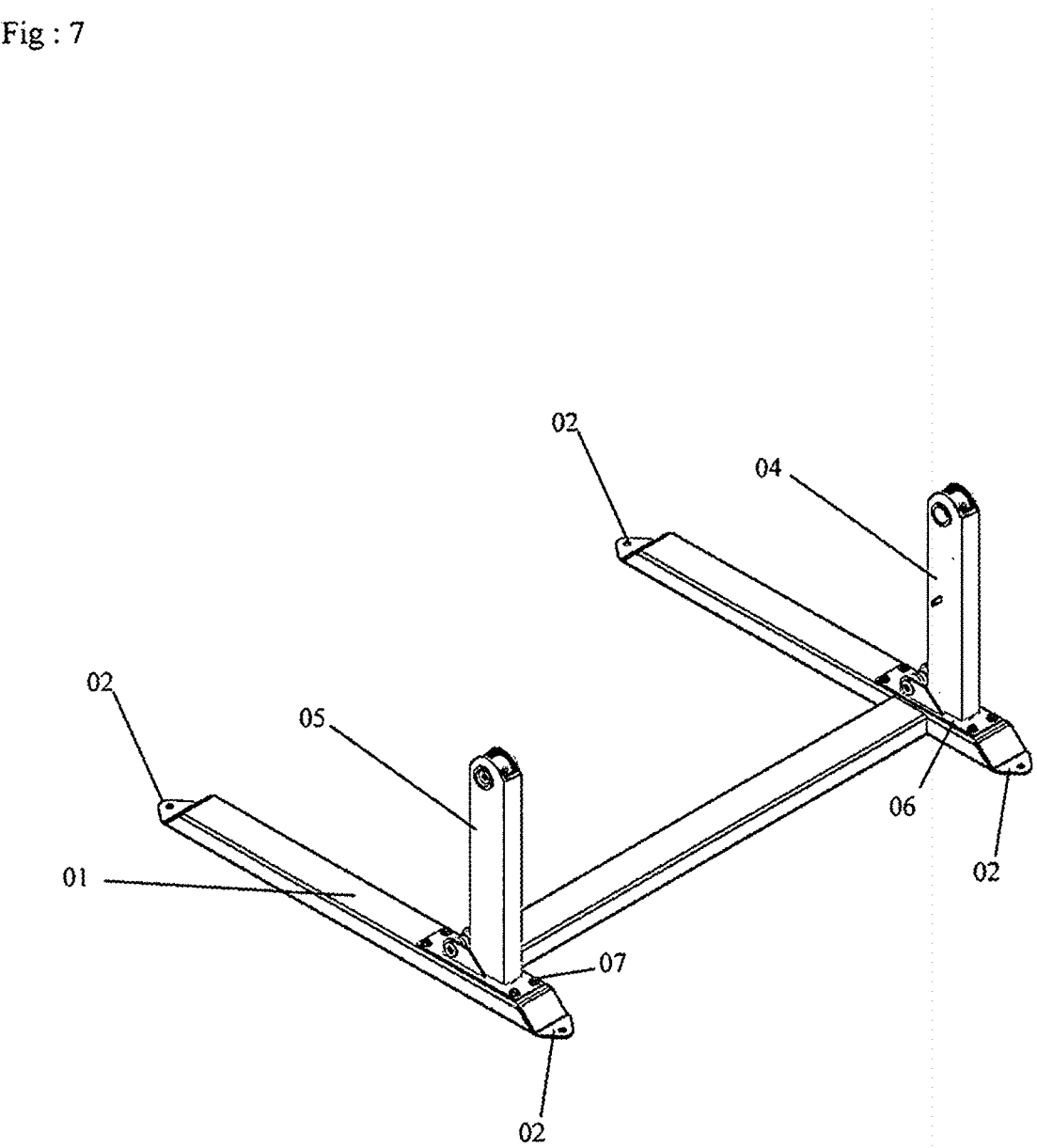

Fig: 8
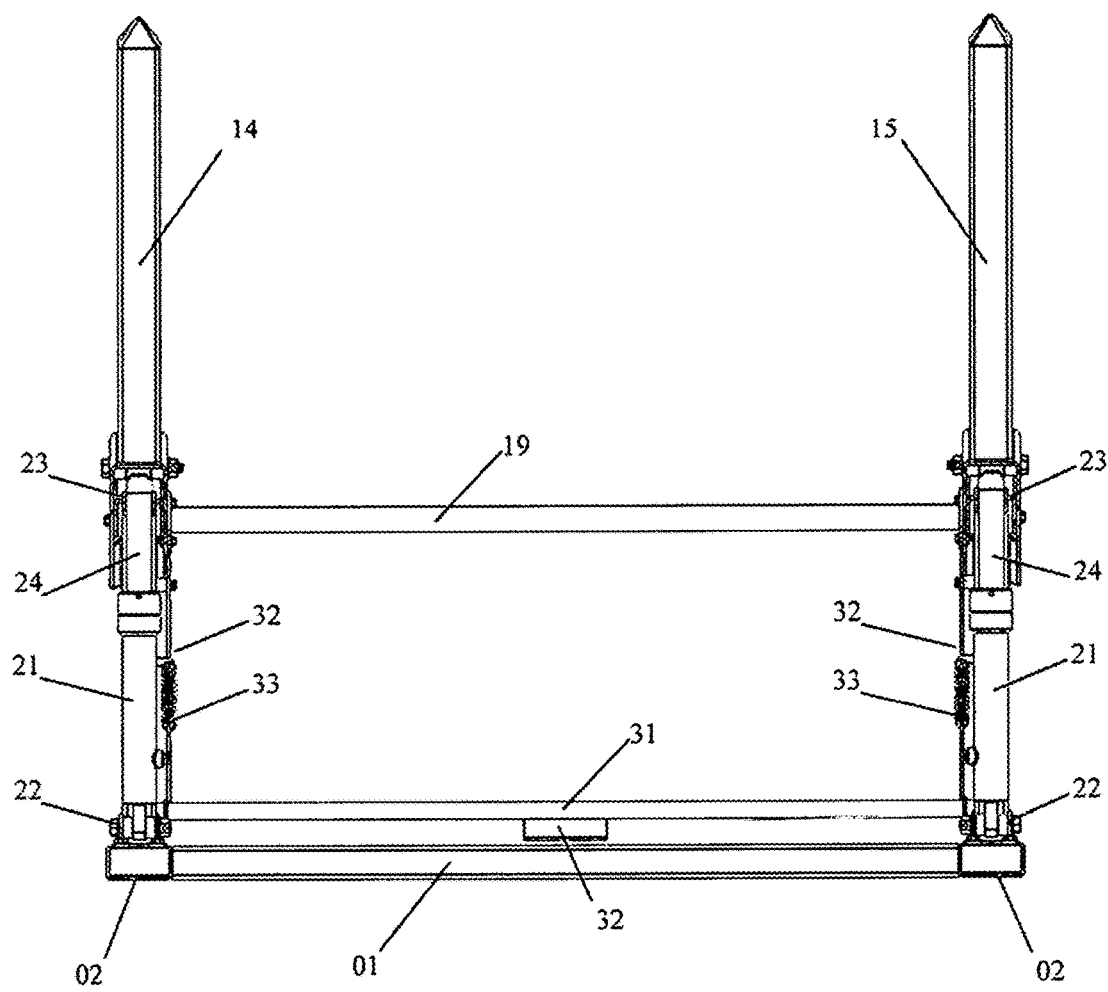

Fig : 9
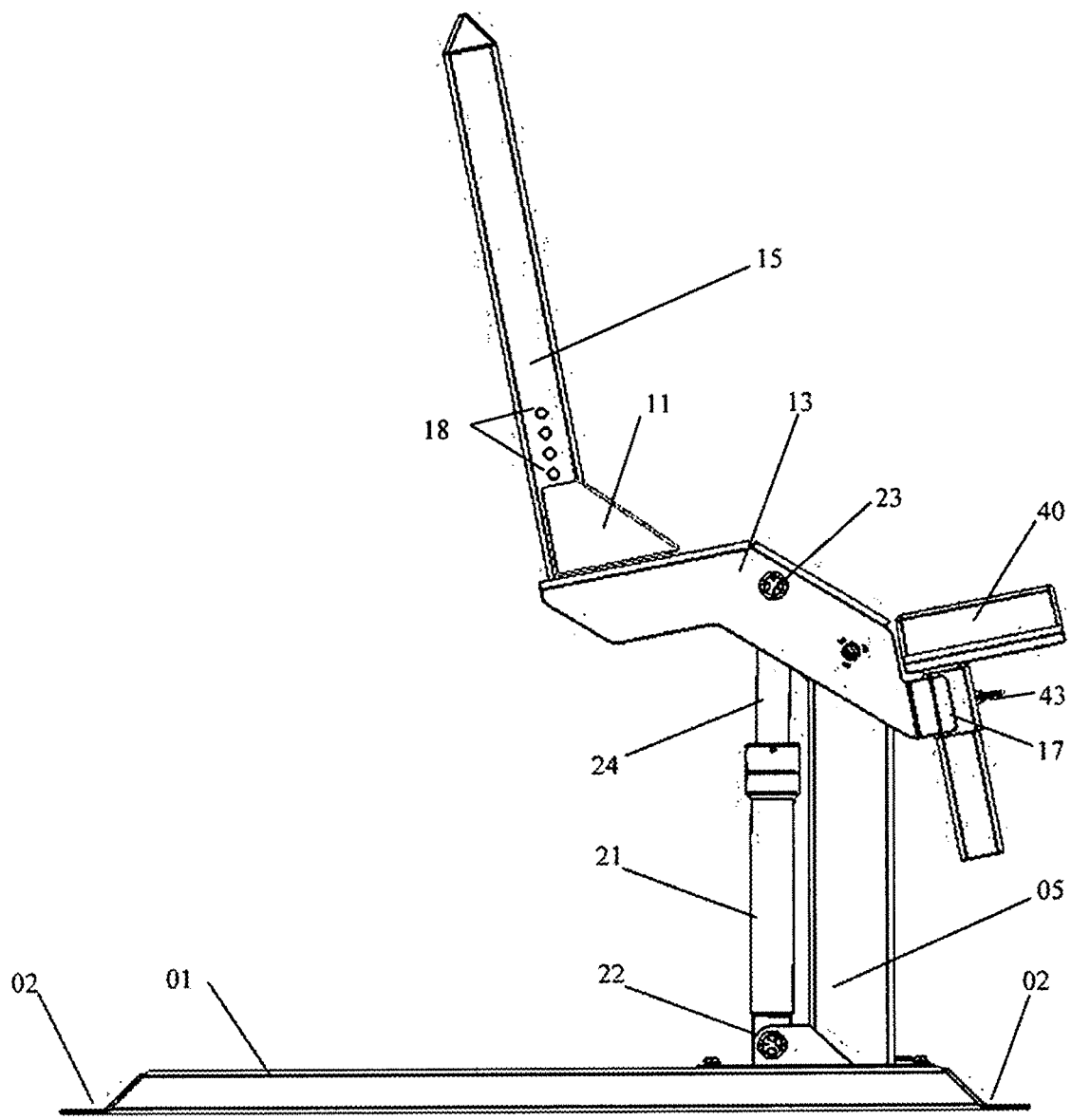

Fig : 10
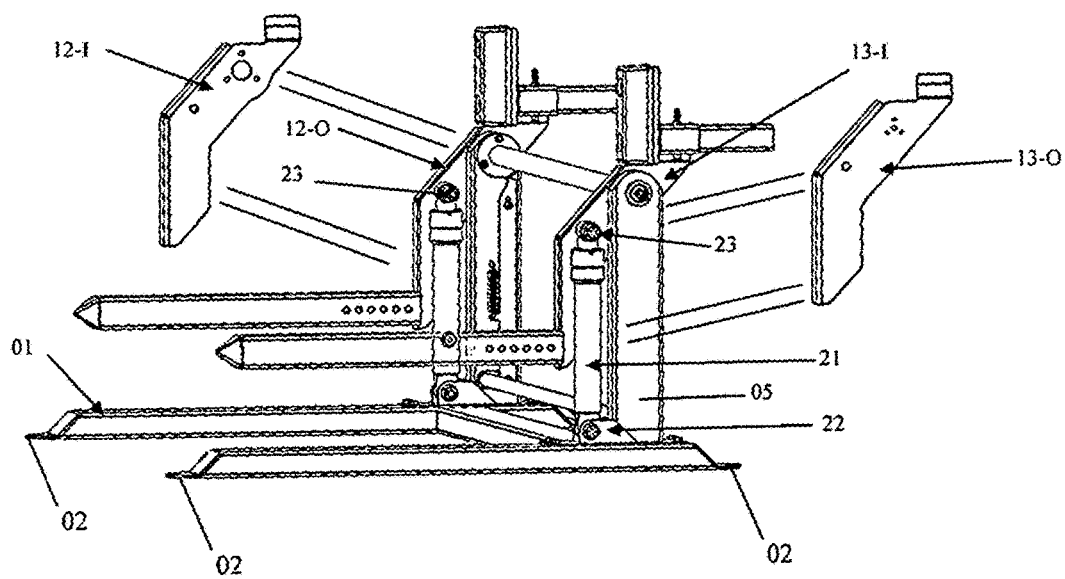

Fig : 12
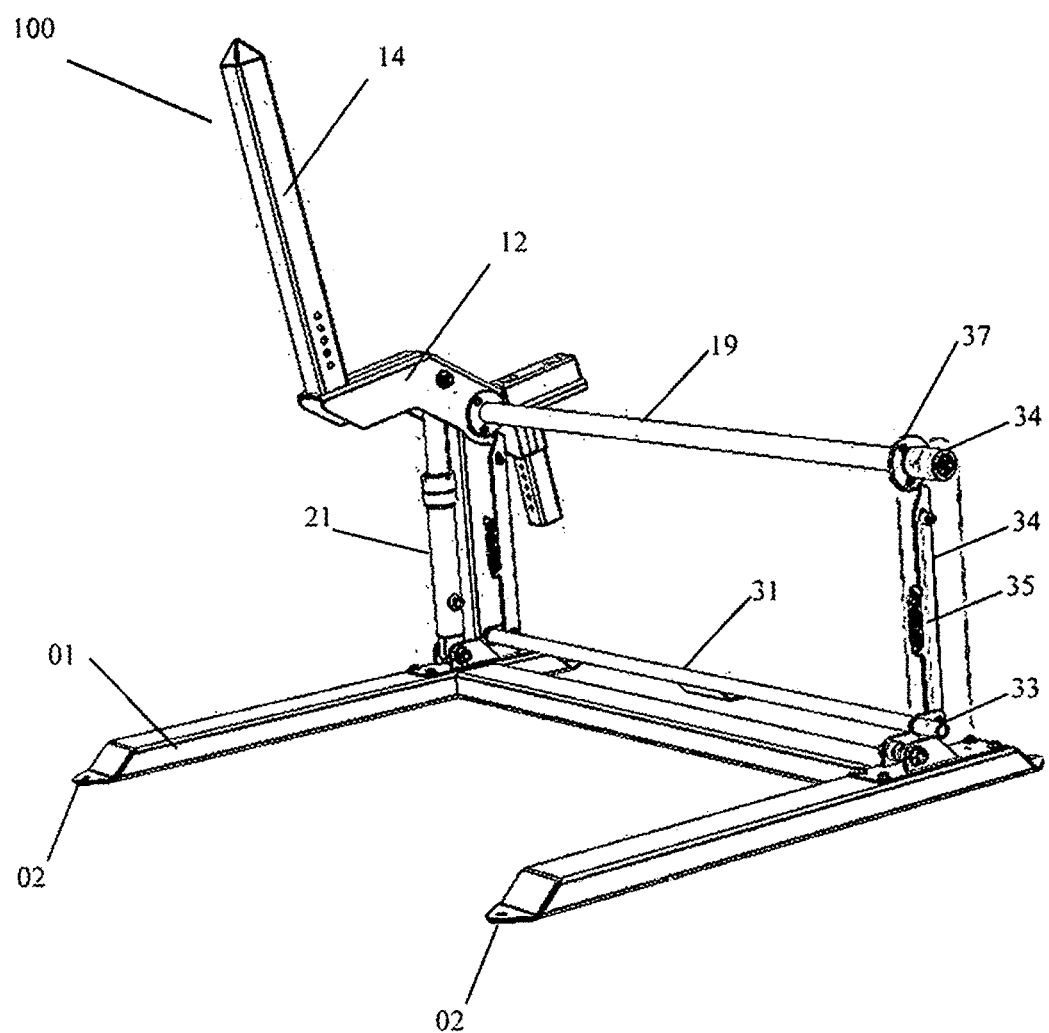

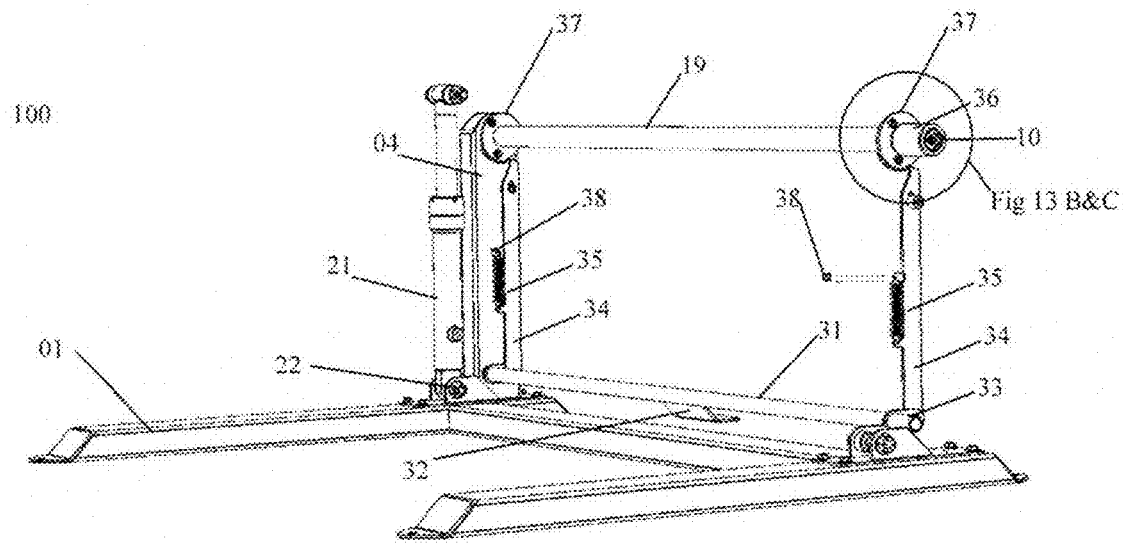
Fig: 13A
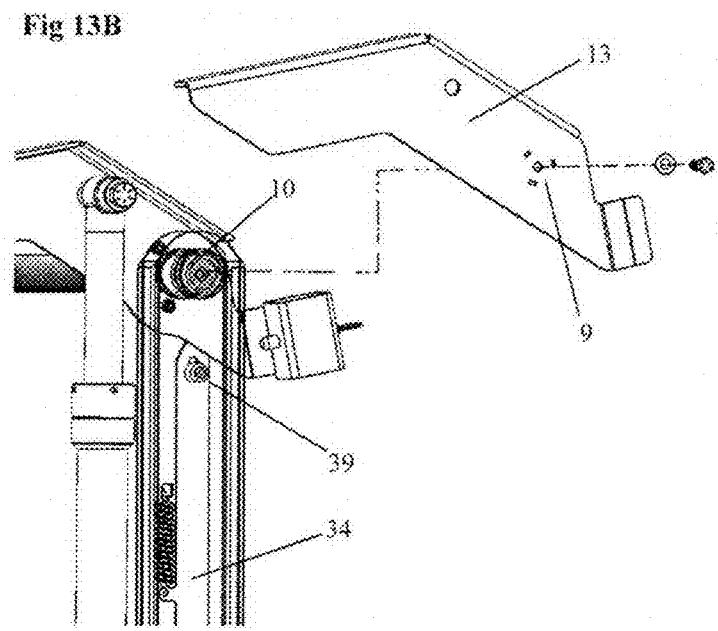
Fig 13B
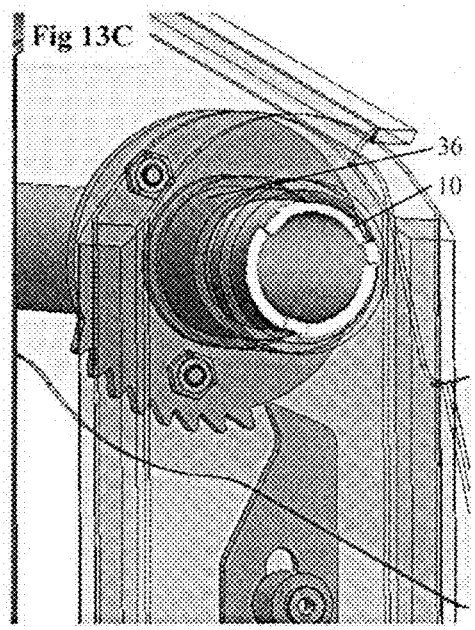
Fig 13C

Fig: 16
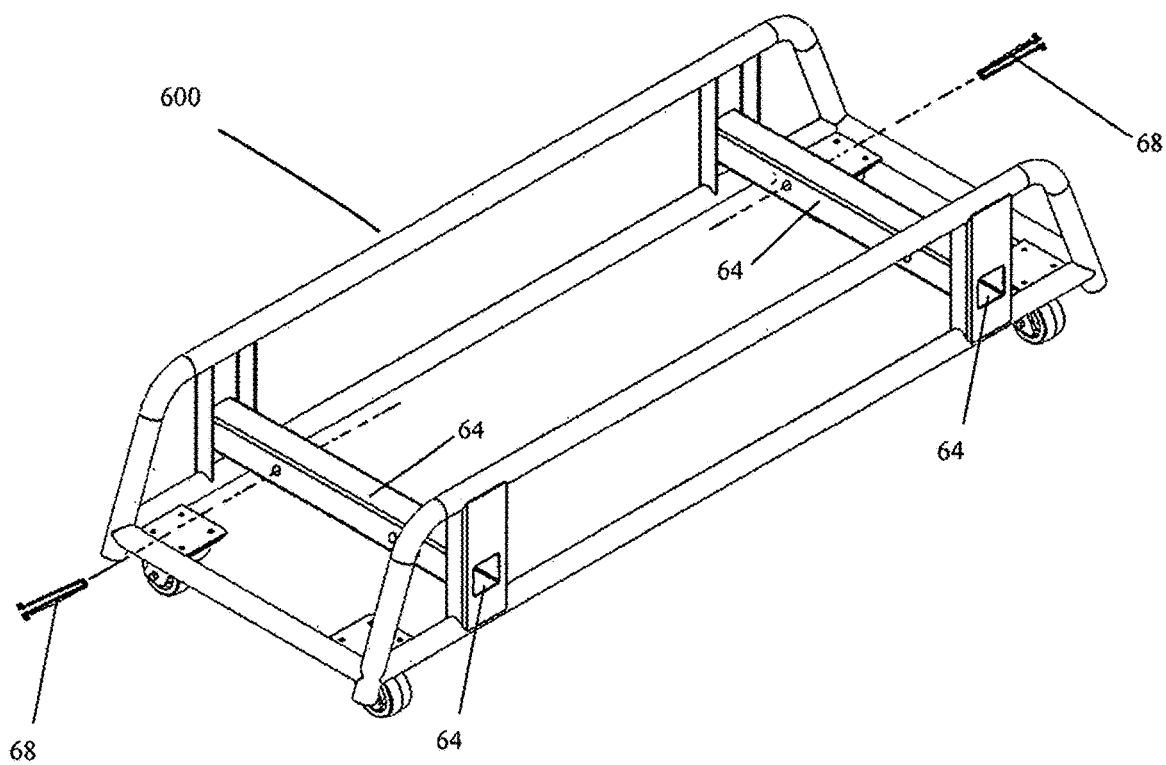

Fig: 17
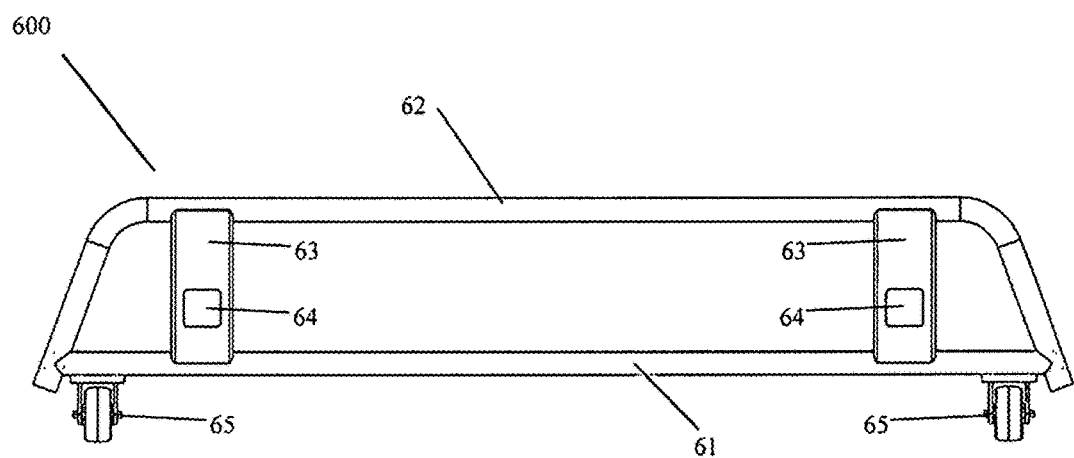

Fig: 18
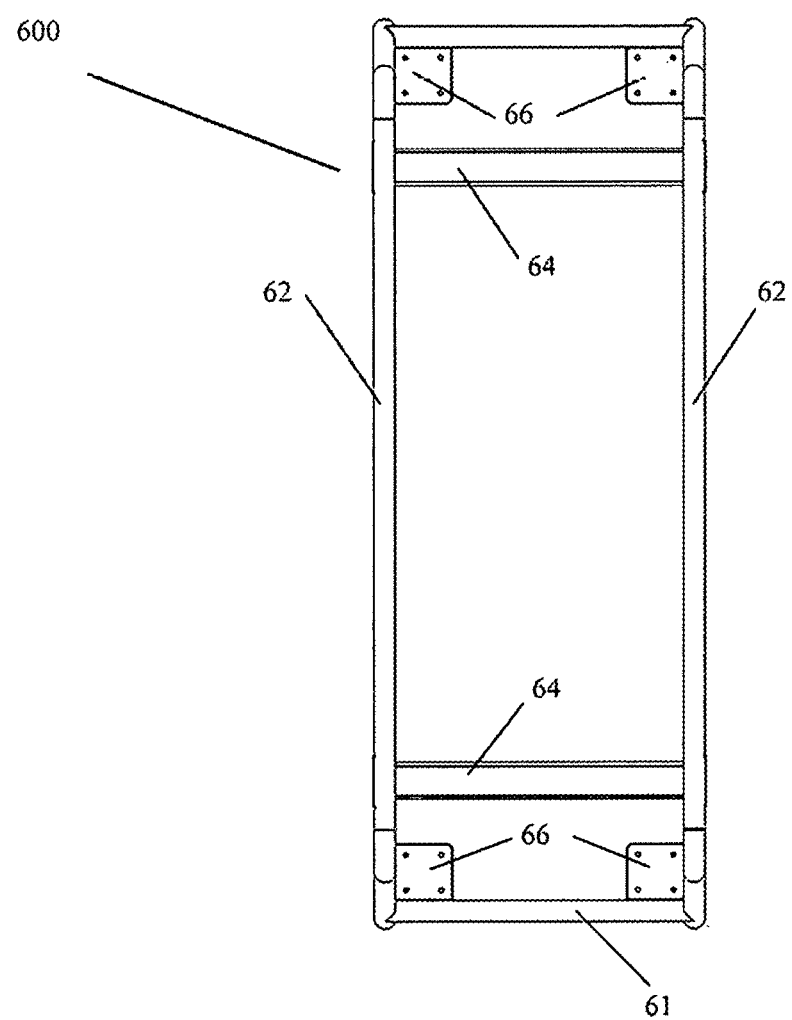

Fig: 19
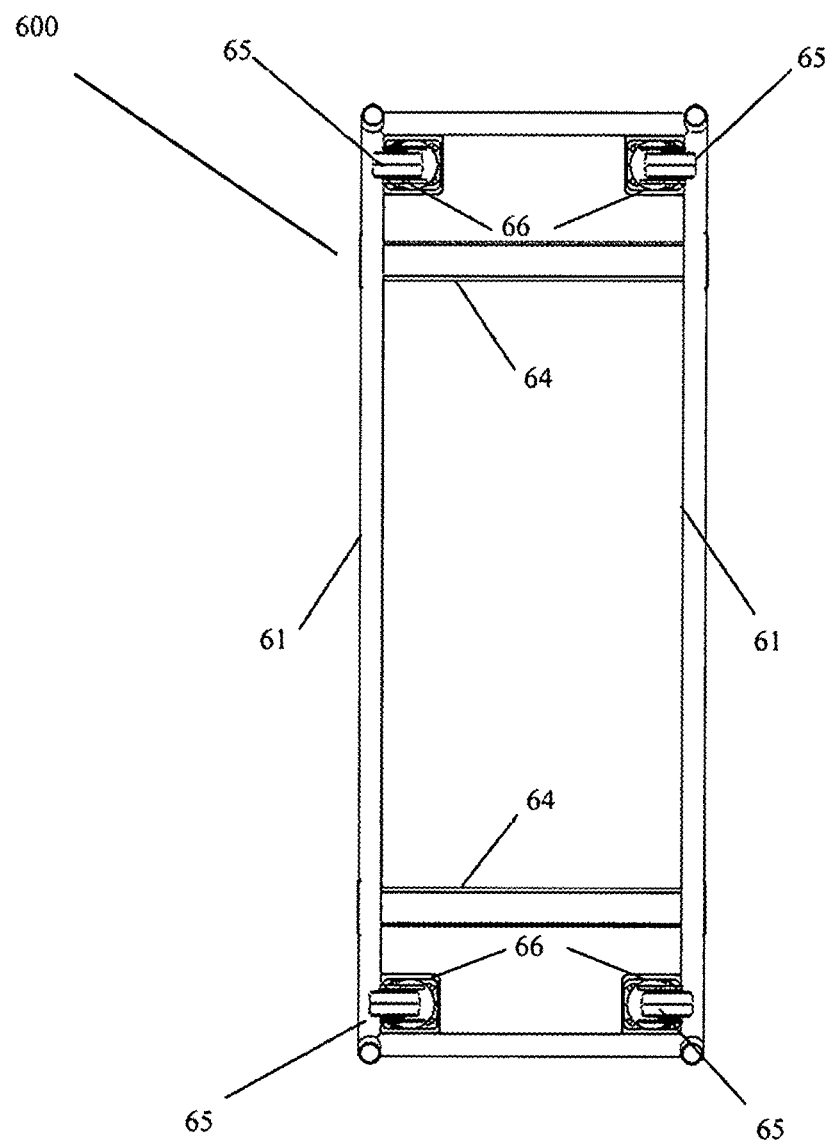

Fig : 20
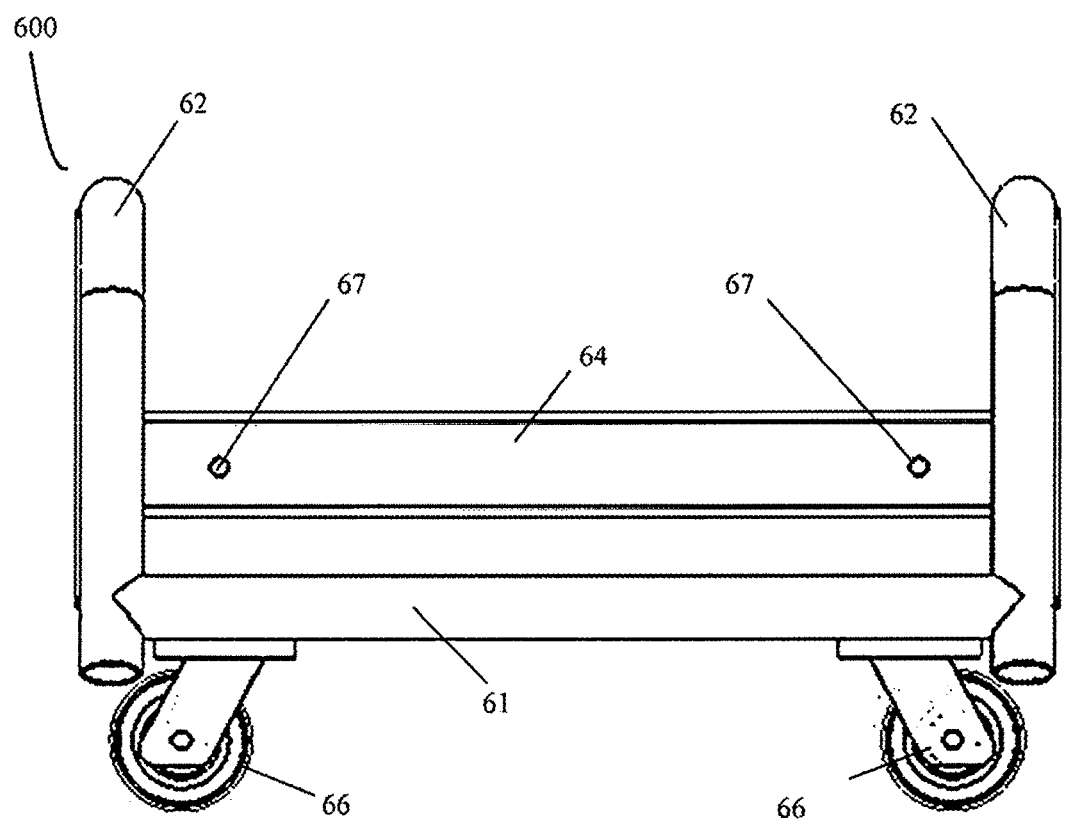

PERSONAL WATERCRAFT LIFT AND TRANSPORTING CART

TECHNICAL FIELD

The present invention is a personal watercraft lift and transporting cart. In particular, the present invention is directed to a lift that can lift and rotate a personal watercraft ("PWC") so that repairs can be conducted more ergonomically.

BACKGROUND ART

A number of different personal watercraft lifts exist. However, these lifts are not directed to putting the PWC in an effective ergonomic position for repair. The most common injury to mechanics working on PWCs is a lower back injury caused by overexertion and straining of the lower back. Accordingly, there exists a need for an improved PWC lift that can lift and rotate a PWC to allow ergonomic access to a PWC's hull and engine compartment.

SUMMARY OF THE INVENTION

The present invention is a personal watercraft lift and transporting cart. In particular, the present invention is directed to a lift that can lift and rotate a personal watercraft ("PWC") so that repairs can be conducted more ergonomically. The lift preferably has two lifting arms attached to upright frame members. In turn, the upright frame members extend vertically from a mounting base. The lift also preferably has two actuators pivotally attached to the lifting arms at one end and attached to the mounting base at the other end. When the actuators extend, the lifting arms lift and rotate. The transporting cart preferably has a cart chassis, a hull bunk and two receivers, where the first and second receiver are spaced to allow insertion of the first and second lifting arms so that the cart can be lifted and rotated by the lift with PWC mounted on the cart.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3 is a top perspective view of a preferred embodiment of the invention with the lift and cart separated;

FIG. 4 is a perspective view of a preferred embodiment of the invention with the PWC lift having raised and rotated the cart;

FIG. 5 is a perspective view of a preferred embodiment of a component of the PWC lift 100;

FIG. 6B is a side perspective view of a preferred embodiment of the hull cushion stop;

FIG. 7 is a perspective view of a preferred embodiment of the PWC lift;

FIG. 8 is a top view of a preferred embodiment of the PWC lift shown in a raised and rotated position;

FIG. 9 is a side view of a preferred embodiment of the PWC lift shown in a raised and rotated position;

FIG. 10 is a side perspective view of a preferred embodiment of the PWC lift shown in a lowered position;

FIG. 12 is a partial front perspective view of a preferred embodiment of the PWC lift shown in the raised and rotated position;

FIG. 13A is a partial front perspective view of a preferred embodiment of the PWC lift shown in the lowered position;

FIG. 13B is a close-up perspective view of a portion of the preferred embodiment in FIG. 13A;

FIG. 13C is a close-up perspective view of a portion of the preferred embodiment in FIG. 13A;

FIG. 16 shows a rear perspective view of a preferred embodiment of the transporting cart;

FIG. 17 shows a front view of a preferred embodiment of the transport cart;

FIG. 18 shows a bottom view of a preferred embodiment of the cart without swivel wheels and showing wheel mounts;

FIG. 19 shows the same view as FIG. 18 but with swivel wheels; and,

FIG. 20 is a side view of a preferred embodiment of the cart.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a personal watercraft lift and transport cart.

Figure 1:
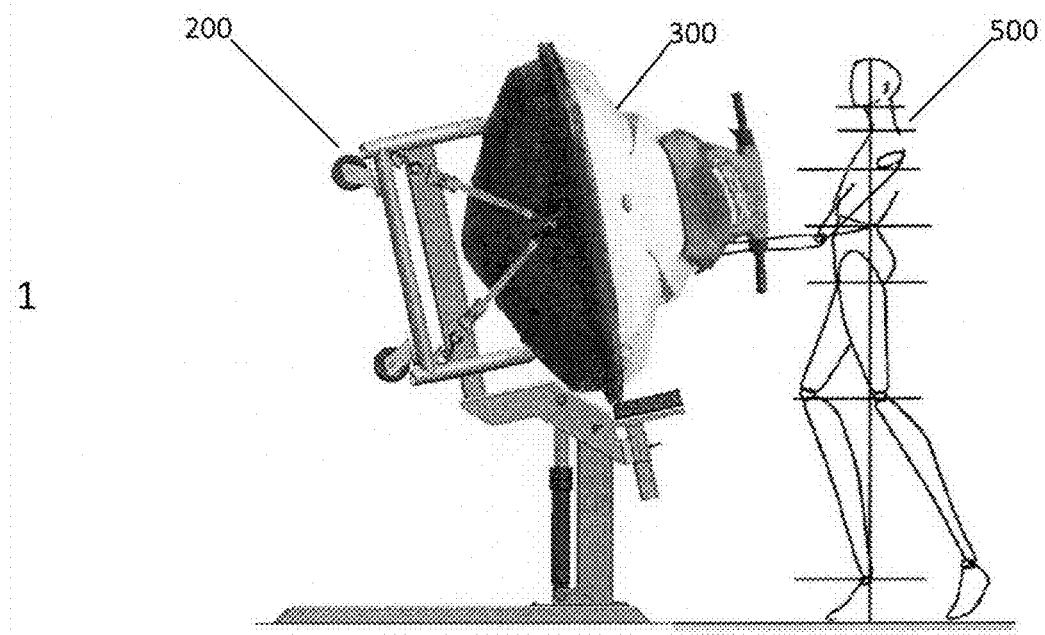
FIG. 1 is a side view of a preferred embodiment of the invention having lifted and rotated a PWC for a user standing in an ergonomically beneficial position.
Figure 2:
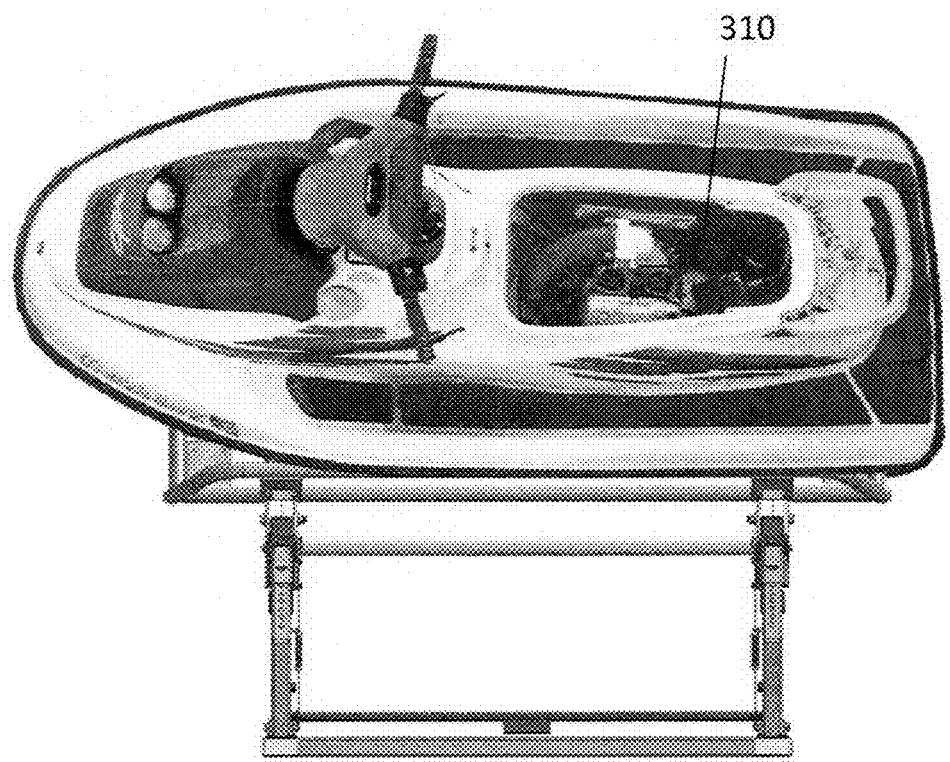
FIG. 2 is a rear view of a preferred embodiment of the invention having lifted and rotated a PWC.

Referring now to FIG. 1, a preferred embodiment of the invention 200 shown having lifted and rotated a PWC 300 so that a user 500, e.g. PWC owner, mechanic, or service technician, can access the PWC's hull or engine compartment 310 (shown in FIG. 2) while standing in an ergonomically beneficial position (rather than bent over and placing strain on the lower back). Preferably, the present invention provides a full lift and 90 degrees rotation of a PWC.

Referring now to FIG. 3, a perspective view of a preferred embodiment of the invention is shown with its two main components separated, the PWC lift 100 and the transport cart 600. A PWC 300 is placed on the transport cart 600. The transport cart 600 preferably has cart receivers 64. The lifting arms 12, 13 of the PWC lift 100 preferably insert into the cart receivers 64 and lift (and rotate) the cart 600 and PWC 300 for, e.g., servicing or repairs. While the PWC lift 100 is preferably used with the cart 600, the PWC lift 100 can be used independently of the cart 600 (and vice versa).

Referring now to FIG. 4, a perspective view of a preferred embodiment of the invention is shown with the PWC lift 100 having raised and rotated the cart 600. Referring now to FIG. 5, a perspective view of a preferred embodiment of a component of the PWC lift 100 is shown. The mounting base 1 is preferably mounted to a concrete floor (not shown) at the four anchor mounts 2 with anchor bolts (not shown) or similar securing means. The mounting base 1 preferably has a first upright frame member 4 extending from a first base plate 6 and second upright frame member 5 extending from a second base plate 7. The first and second base plates 6, 7 are preferably welded to the upright frame members 4, 5, and either bolted or welded to the mounting base 1.

Figure 6A:
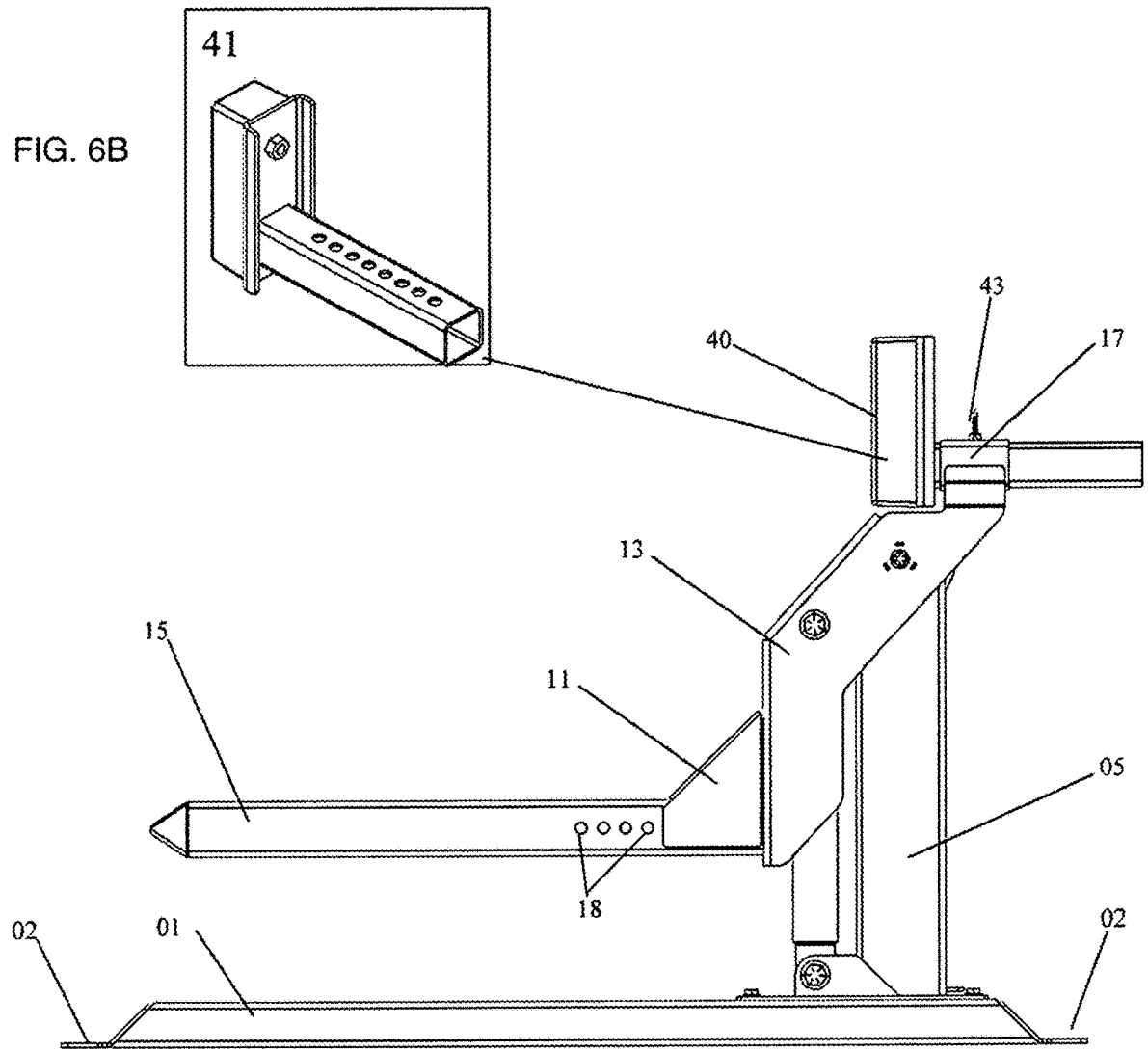
FIG. 6A is a side view of a preferred embodiment of the PWC lift shown in the lowered position.

Referring now to FIG. 6A, a side view of a preferred embodiment of the PWC lift 100 is shown in the lowered position. The lifting arm 13 preferably has three parts. The lifting arm 13 has a second lower extension arm 15 and first lower extension arm 14 (not shown in FIG. 6A) that extend outward to, inter alia, engage the transport cart 600 (not shown in FIG. 6A). The lifting arms 12, 13 preferably have transport cart adjustable stops 18 to be preferably used to secure the transport cart 600. A first and second receiver 16, 17 (not shown) is preferably on the upper side of the lifting arms 12, 13 and accept hull cushion stop 41 shown in FIG. 6B. A perspective view of a preferred embodiment of the PWC lift 100 is shown in FIG. 7. A top view of a preferred embodiment of the PWC lift 100 is shown in a raised and rotated position in FIG. 8. A side view of a preferred embodiment of the PWC lift 100 is shown in a raised and rotated position in FIG. 9.

Figure 11:
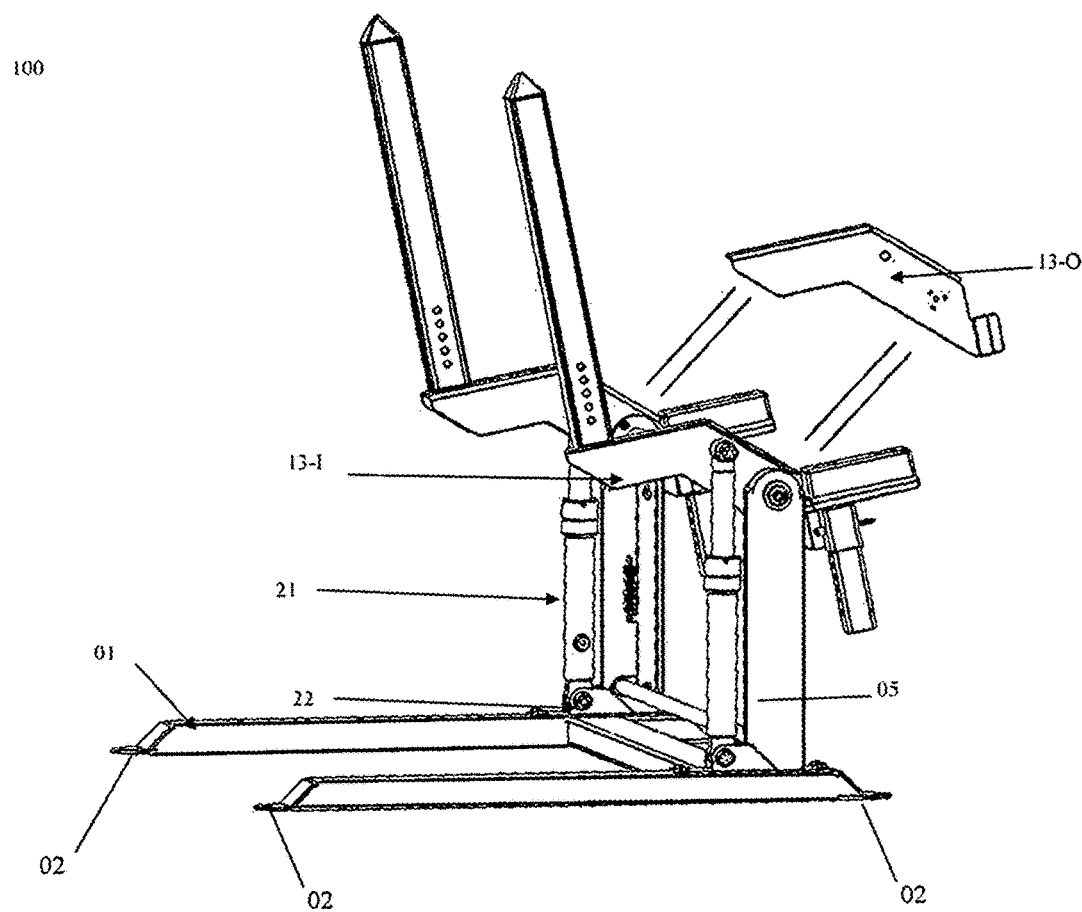
FIG. 11 is a side perspective view of a preferred embodiment of the PWC lift shown in the raised and rotated position.

Referring now to FIG. 10, a side perspective view of a preferred embodiment of the PWC lift 100 is shown in a lowered position. As shown, cylinder/actuators 21 have mounts 23 and 22 connecting the cylinder/actuators 21 to the lifting arms 12, 13. The lower cylinder mounts 22 are pivotally attached to the first and second base plates 6 and 7 and preferably bolted to the mounting base 1 and preferably welded to the frame mounts 4 and 5. A side perspective view of a preferred embodiment of the PWC lift 100 is shown in the raised and rotated position in FIG. 11. As shown, the cylinder/actuators 21 are extended and the lifting arms 12, 13 are raised and rotated. The cylinder/actuators 21 are preferably electric hydraulic. The hydraulic pump can be powered by 12v, 24v, 110v or 220v. Depending on the application, the pump would activate two hydraulic cylinders. Alternately, electric or hydraulic electric actuators can be used instead of a hydraulic pump and cylinders with actuators. The invention can also be operated with an electric or a hydraulic electric actuator.

Referring now to FIG. 12, a partial front perspective view of a preferred embodiment of the PWC lift 100 is shown in the raised and rotated position. The right side upright frame is made transparent to better show a preferred embodiment locking system for the PWC lift 100. Referring now to FIG. 13A, a partial front perspective view of a preferred embodiment of the PWC lift 100 is shown in the lowered position. The PWC lift 100 preferably has a locking system that automatically engages the lifting arms 12, 13 at various intervals so that the lift 100 can be set and/or stopped at a desired angle for service on a PWC. The locking system preferably has a single foot pedal release 32 that is mounted to the lock rotating connecting bar 31 such that when the pedal release 32 is actuated, the rotation of the lifting arms 12, 13 will be free to lower into a desired rotation angle or to the ground.

The first lifting arm 12 and the second lifting arm 13 are preferably connected together by the torsion control bar 19 and by two cam latches 37 that are bolted to the lifting arms 12, 13. The torsion control bar 19 keeps the lifting arms 12, 13 parallel to one another when raising and lowering the lift 100 and while equalizing pressure to the upright frame members 4, 5.

The locking system preferably is automatically engaged by the use of a set of lock return springs 35. The top end of the spring 35 is connected to a spring hammer 38 that is attached to a lock linkage bar 34. The lock return spring 35 preferably has constant pressure keeping the lock linkage bar 34 in the upward position to engage the cam latch 37. The cam latches 37 are preferably made with saddle notches that allow engagement of the lock linkage bar 34 at a series of different positions that allow the lift 100 to be secured at a variety of different positions. The upper end of the lock linkage bar 34 is attached to the first upright frame member 4 and second upright frame member 5 with a stationary lock mount 39 (shown in FIG. 13B). Each end of the torsion control bar 19 has a castellated fitting 10 (shown in FIG. 13C) that attaches to the outside of the first lifting arm 12 and second lifting arm 13 with matching female slotted holes 9 (shown in FIG. 13B) where the cam latch 37 is attached to inside of the first lifting arm 12 and second lifting arm 13. Thus, as the first lifting arm 12 and second lifting arm 13 are raised, the torsion control bar 19 and cam latch 37 rotate allowing vertical movement of the lock linkage bar 34 where the lower end is connected to the lock rotating connecting bar 31. The lock rotating connecting bar 31 is connected to the first and second upright mounts 4, 5 through the bushing mount 33 that is preferably fixed and part of the upright fame members 4,5. To disengage the locking system, pressure is applied to the lock pedal release 32. The downward pressure on the pedal 32 rotates the lock rotating connecting bar 31 that, in turn, pulls down on the two lock linkage bars 34 and disengages the two cam latches 37 allowing the lifting arms 12, 13 to lower in a controlled fashion by the two cylinder/actuators 21.

Figure 14A:
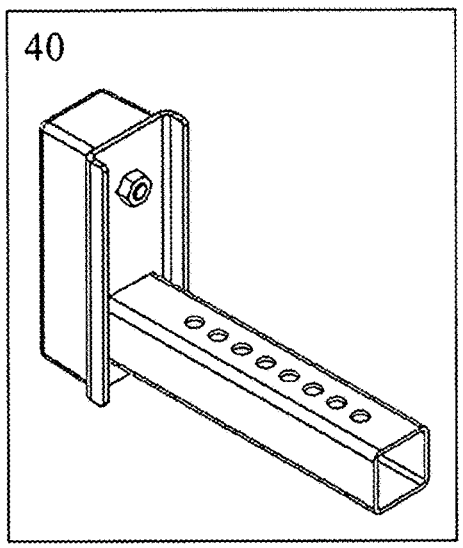
FIG. 14A is a rear perspective view of a preferred embodiment of the hull cushion stop.
Figure 14B:
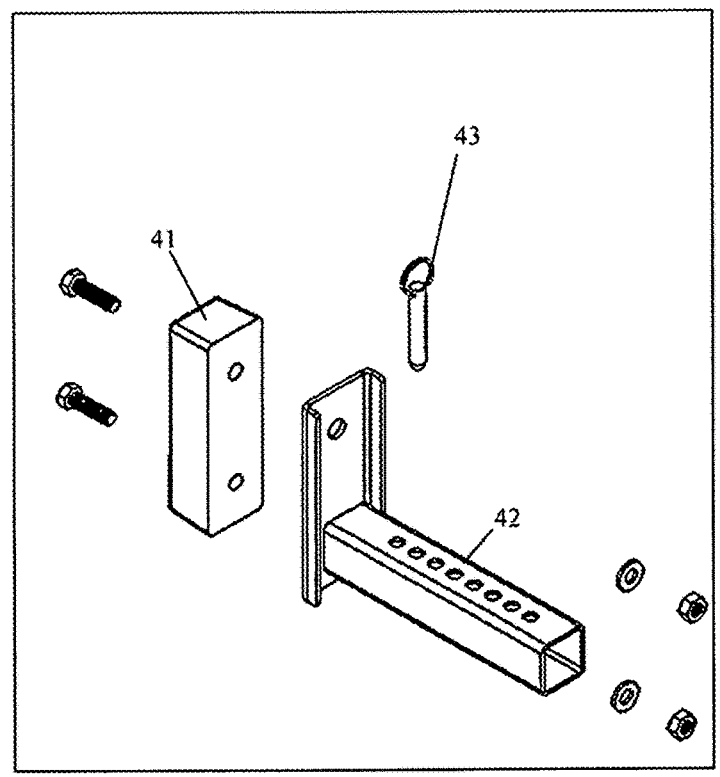
FIG. 14B is an exploded rear perspective view of a preferred embodiment of hull cushion stop.

Referring now to FIG. 14A, a rear perspective view of a preferred embodiment of the hull cushion stop 40 is shown. An exploded rear perspective view is shown in FIG. 14B. The hull cushion stop 40 is preferably comprised of an adjustable telescoping receiver 42 and a cushion 41 that can be made of urethane, rubber or a similar material. A boat or PWC hull preferably sits against the cushion 41 to prevent or reduce scratching or otherwise damaging the surface of the hull. The adjustable telescoping receiver 42 is preferably made with a series of mounting holes in the top or side to adjust the hull cushion stop 40 by telescoping inward and outward to a desired distance to contact the boat or PWC hull. A stop release pin 43 is preferably used to secure the adjustable telescoping receiver 42 into the first and second receivers 16, 17 (shown in FIG. 15A.)

Figures 15A, 15B, 15C:
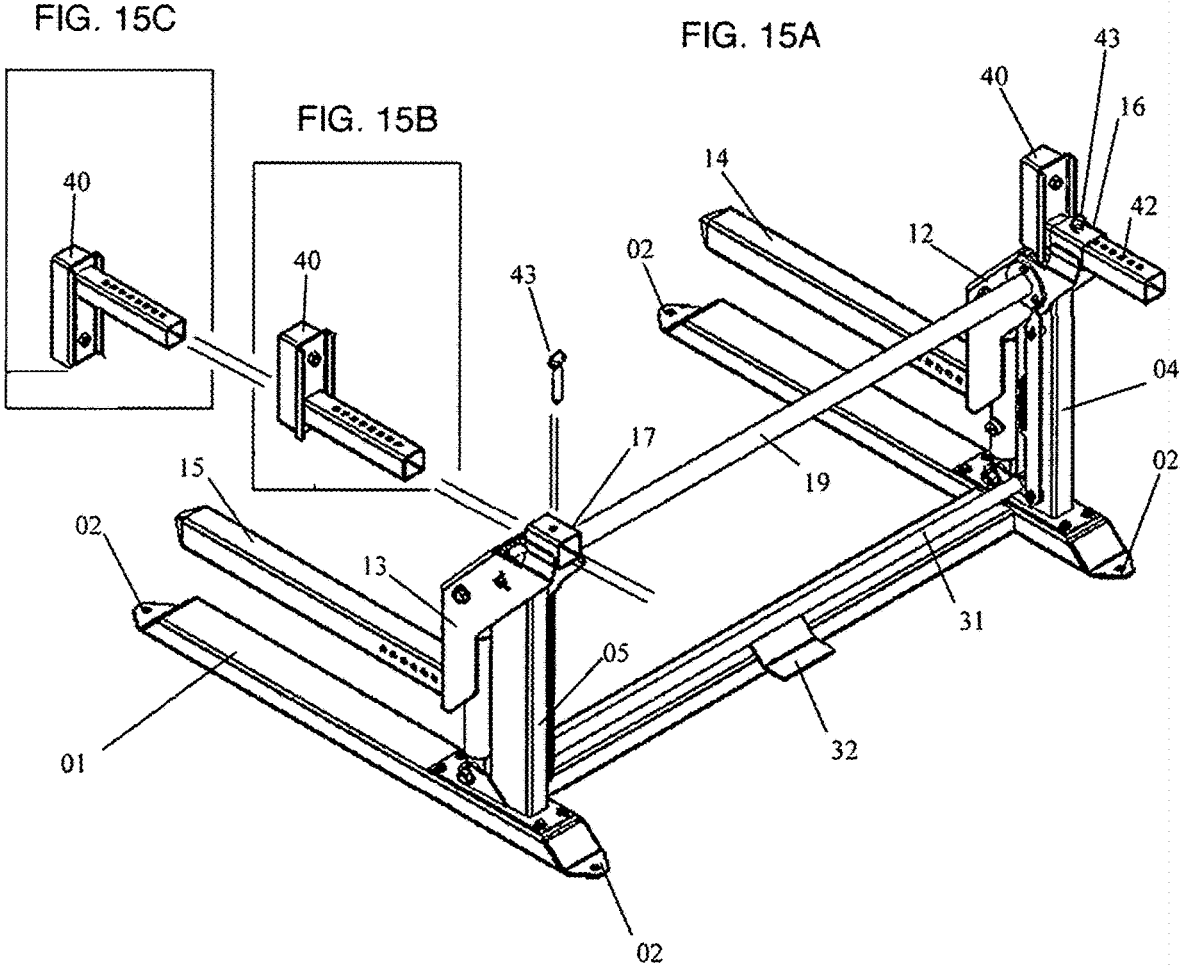
FIG. 15A is a perspective rear view of a preferred embodiment of the PWC lift.
FIG. 15B shows a preferred embodiment of the hull cushion stop removed from the receiver and in a vertical or raised position.
FIG. 15C shows a preferred embodiment of the hull cushion stop in a lowered/descending position.

Referring now to FIG. 15A, a perspective rear view of a preferred embodiment of the PWC lift 100 is shown. The PWC lift 100 preferably has two hull cushion stops 40 that are adjustable horizontally and vertically to first a variety of PWC and boat hull sizes, shapes and configuration to keep the PWC stable and secure at a set location and preventing or reducing movement while the lift 100 lifts and/or rotates. FIG. 15A shows a hull cushion stop 40 in a vertical or raised position inserted into the first receiver 16 with the stop release pin 43 inserted through the first receiver 16 and the adjustable telescoping receiver 42. FIGS. 15B and 15C show the hull cushion stop 40 removed from the receiver 17. FIG. 15B shows the stop 40 in a vertical or raised position. FIG. 15C shows the stop 40 in a lowered/descending position.

Referring now to FIG. 16, a rear perspective view of a preferred embodiment of the transporting cart 600 is shown. Preferably, a PWC is secured to the transportation or service cart 600 for placement on the lifting arms 12, 13 at the receivers 64. The lifting arms 12, 13 are preferably secured in the receivers 64 with set pins 68. Thus, as the lift 100 raises and rotates the cart 600, the cart is securely held in place on the arms 12, 13 by the set pins 68 that also secure the cart 600 to the first and second lower extension arms 14, 15.

Referring now to FIG. 17, a front view of a preferred embodiment of the transport cart 600 is shown. The rear and front views of the cart 600 are preferably identical as the cart 600 is reversible. The cart 600 preferably has four rolling swivel wheels 65 that are attached to wheel mounts 66. The mounts 66 are preferably part of the cart chassis 61. A PWC 300 preferably is seated on the cart 600 at the hull bunk 62 on the cart chassis 61. The cart receivers 64 are located in vertical supports 63 and spaced so that the lifting arms 12, 13 of the lift 100 can slide easily into the receivers 64. FIG. 18 is a bottom view of a preferred embodiment of the cart 600 without swivel wheels 65 showing wheel mounts 66 and FIG. 19 is the same view with swivel wheels 65 shown.

Referring now to FIG. 20, a side view of a preferred embodiment of the cart 600 is shown. The cart 600 preferably has adjustable stops 67 on the cart receivers 64. The adjustable stops 67 are where the lifting arms 12, 13 are secured to the cart 600 in the receivers 64 with set pins 68.

Thus, an improved personal watercraft lift and transport cart are described above that can lift and rotate a PWC to allow ergonomic access to a PWC's hull and engine compartment. In each of the above embodiments, the different positions and structures of the present invention are described separately in each of the embodiments. However, it is the full intention of the inventors of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A combination of a personal watercraft lift and a personal watercraft transporting cart comprising:
   the lift having a first lifting arm and second lifting arm, the first lifting arm pivotally attached to a first upright frame member, the second lifting arm pivotally attached to a second upright frame member, where the first and second upright frame members extend vertically from a mount base and the first and second lifting arms are connected by a torsion control bar;
   the lift further comprising a first actuator pivotally attached to the first lifting arm and a second actuator pivotally attached to the second lifting arm, where the first and second actuators are attached to the mount base and are extendible to lift and rotate the lifting arms; and,
   the transporting cart comprising a cart chassis, a hull bunk, a first receiver and a second receiver, where the first and second receivers are spaced such that the first receiver is positioned to receive only one of the lifting arms and the second receiver is positioned to receive only the other one of the lifting arms:
   where the first and second lifting arms further each comprise a plurality of arm stops and the first and second receivers further comprise a plurality of cart stops aligned with the plurality of arm stops when the first and second lifting arms are inserted in the first and second receivers such that set pins can be inserted into the cart stops and arm stops to secure the cart to the lifting arms in an adjustable fashion.

2. The combination of a personal watercraft lift and a personal watercraft transporting cart of claim 1 where the lift can rotate the transporting cart and any watercraft in the cart as a single unit at least 90 degrees.

\* \* \* \* \*